(12) United States Patent
Mendez et al.

(10) Patent No.: US 11,485,166 B2
(45) Date of Patent: Nov. 1, 2022

(54) PORTABLE METHOD AND APPARATUS FOR FOLDING PLASTIC COMPOSITE FLOORING

(71) Applicant: NewGen Enterprises, LLC, Boynton Beach, FL (US)

(72) Inventors: Carlos Mendez, Miami, FL (US); Joel Ruiz, Miramar, FL (US)

(73) Assignee: NewGen Enterprises, LLC, Boynton Beach, FL (US)

( * ) Notice: Subject to any disclaimer, the term of this patent is extended or adjusted under 35 U.S.C. 154(b) by 328 days.

(21) Appl. No.: 16/864,699

(22) Filed: May 1, 2020

(65) Prior Publication Data

US 2020/0346482 A1  Nov. 5, 2020

Related U.S. Application Data

(60) Provisional application No. 62/867,061, filed on Jun. 26, 2019, provisional application No. 62/842,725, filed on May 3, 2019.

(51) Int. Cl.
*B44B 5/02* (2006.01)
*E04F 15/02* (2006.01)
*B29C 51/42* (2006.01)

(52) U.S. Cl.
CPC ............ *B44B 5/028* (2013.01); *B29C 51/422* (2013.01); *B29C 51/428* (2013.01); *E04F 15/0215* (2013.01)

(58) Field of Classification Search
CPC ... E04F 11/17; E04F 15/0215; E04F 11/1043; E04F 15/105; B29C 51/422; B29C 51/428; B44B 5/028
See application file for complete search history.

(56) References Cited

U.S. PATENT DOCUMENTS

| 8,561,369 B2 | 10/2013 | Insa |
| 8,590,266 B2 | 11/2013 | Young |
| 10,138,639 B2 | 11/2018 | Moore et al. |
| 2006/0032175 A1 | 2/2006 | Chen et al. |

*Primary Examiner* — Monica A Huson
(74) *Attorney, Agent, or Firm* — McHale & Slavin, P.A.

(57) ABSTRACT

A method of folding plastic composition flooring, including but not limited to LVP, LVT, SPC or WPC, to form a desired shape, such as stair noses, baseboards, quarter rounds, T-moldings, endcaps, or the like. The method includes the steps of incorporating a thermal insulation layer between the plastic composite flooring and a heat generator, applying heat until reaching a heat transmission coefficient to allow the plastic composite flooring to become malleable, removing the heat, applying pressure to the heated section of the plastic composite flooring to form into a desired shape using a positive and negative embossing die mold on the top and bottom heated section of the plastic composite flooring, and removing the embossing die-molds once the plastic composite flooring has cooled down to its initial temperature.

10 Claims, 5 Drawing Sheets

Fig. 12

PORTABLE METHOD AND APPARATUS FOR FOLDING PLASTIC COMPOSITE FLOORING

PRIORITY CLAIM

In accordance with 37 C.F.R. § 1.76, a claim of priority is included in an Application Data Sheet filed concurrently herewith. Accordingly, this application claims the benefit of U.S. Provisional Patent Application No. 62/842,725 filed May 3, 2019, entitled "PORTABLE METHOD AND APPARATUS FOR FOLDING PLASTIC COMPOSITE FLOORING," and U.S. Provisional Patent Application No. 62/867,061 filed Jun. 26, 2019 entitled "PORTABLE METHOD AND APPARATUS FOR FOLDING PLASTIC COMPOSITE FLOORING", the contents of which are incorporated herein by reference.

FIELD OF THE INVENTION

The present invention relates to the installation of plastic composite flooring, and in particular, to a portable method and apparatus that applies heat and pressure to plastic composite floorings to fold such into provisions, such as, but not limited to, stair noses, baseboards, quarter rounds, T-moldings, and endcaps.

BACKGROUND OF THE INVENTION

Installation of flooring requires an installer to adapt to the particular substrate that forms the floor foundation. Typically, an installer must accommodate various provisions which include stair noses, baseboards, quarter rounds, T-moldings, endcaps, and the like. Stair noses are provisions that are installed at the edge of stair treads above and at the edge of the flooring. Baseboards are a narrow wooden board running along the base of an interior wall, typically installed above flooring. Quarter-rounds are a convex folding with a cross section in the form of a quarter circle; it is typically used as a decorative build-up element at the lower edge of a baseboard to hide any gaps between the baseboard and a floor. Trim folding is a general term used for corner moldings, accent molding, endcaps and the like, and is used to create added detail or cover up gaps; it is typically installed above the flooring.

The similarities in all the above provisions are that they are installed separate from the flooring, which can cause a mismatch with flooring. For instance, these provisions may be used to fill gaps between flooring and walls junctions. The provisions may not match the rest of the flooring material, or the estimator may have under/over ordered such pieces, adding to the burden of the installation. In many instances, the provisions are constructed of a different material, such as solid milled wood, plaster, plastic, or reformed wood, which can lead to different textures, visual appearance, wear patterns, and an unhappy consumer. It is desired at times to provide a seamless transition from the floor to the wall junction, which is not possible with conventional flooring.

Flooring, as used herein, is a general term for a permanent covering of a floor, or for the work of installing such a floor covering. It also generally describes any finish material applied over a floor structure to provide a walking surface. The most common flooring materials include wood, laminate, tile and vinyl. The choice of flooring material is affected by factors such as cost, endurance, noise insulation, comfort and cleaning effort. Some types of flooring should not be installed below grade, such as laminate and hardwood, unless a barrier material is put in place to avoid potential damage from moisture.

Luxury vinyl tile and luxury vinyl plank are usually less than 4 mm in thickness. LVT and LVP are soft and pliable, and will not be forgiving with subfloor imperfections. They are available in click lock, loose lay and glue down versions.

One of the latest trends in home flooring design is rigid core flooring. Many homeowners are choosing this stylish and affordable option to give their home a new look. There are two main types of rigid core flooring: stone plastic composite and wood plastic composite. A stone plastic composite (SPC) vinyl and wood plastic composite (WPC) vinyl flooring is manufactured with a wood-plastic composite backing instead of a solid PVC backing. The backing combines recycled wood pulp and plastic composites to form a bond of strength and stability. It is then topped with a standard vinyl top layer.

The basics about stone plastic composite (SPC) vinyl flooring and wood plastic composite (WPC) vinyl flooring is that it is constructed of layers, which helps it provide superior comfort and stain resistance. Generally, there are four layers. The top "wear" layer which protects and guards against scratches, dents, stains, and general wear and tear. The second printed vinyl layer, which lies just below the wear layer. This layer has imprinted design and colors. Under the second layer is the waterproof core, which is the biggest benefit of SPC and WPC flooring, as it won't buckle, ripple, or show any other sign of liquid damage due to moisture. The final layer contains a padded underlayment, making it ideal for floating installation. Rigid core as used herein is identified as WPC, SPC, or densified foam core.

There are a variety of benefits associated with SPC and WPC flooring. They both have a completely waterproof core, thereby helping to prevent warping when exposed to moisture. Additionally, their waterproof property allows for this type of flooring to be used in areas of the home where hard flooring and other moisture-sensitive flooring types are not typically recommended, such as laundry rooms, basements, bathrooms, and kitchens. Both are resistant to scratches and stains, as well as major impacts due to their density. Generally, SPC and WPC flooring comes in thickness of 3.2 mm to 12 mm. A thicker flooring option can make up for slight flaws in subfloor defections. They hold up well to wear and tear, even in high-traffic areas of the home. They are also easy to install, making them a good choice for "DIY" homeowners. They are made to be installed on top of just about any type of subfloor or existing floor, and do not require adhesives. Lastly, there is a large variety of stylish options, as they come in just about any color and pattern, since the design is simply printed onto the vinyl layer. For example, one can get WPC or SPC flooring that looks like tile, stone, or hardwood flooring.

One beneficial aspect of SPC and WPC flooring is its ability to conform. The present invention discloses a method of applying heat and pressure to a plastic composite flooring system to fold such into provisions, such as stair noses, baseboards, quarter rounds, T-moldings, endcaps, or the like.

U.S. Pat. No. 8,561,369 illustrates a molding profile having interlocking profiles to transition from a first flooring surface to a second flooring surface.

U.S. Pat. No. 8,590,266 discloses a machine and method for installing curved hardwood flooring. The machine maintains the wood grain in the direction of any bends required to conform to a curved structure. The method has a first step to establish the desired floor boundary and anchor a plurality of pressure units in place at appropriate intervals to accurately represent the desired shape of the curved hardwood floor to be installed. A second step is to make appropriate adjustments to the pressure units and position the hardwood flooring in the machine. A third step is to activate the pressure units to bend the flooring into the desired contour, hold securely, make adjustments if necessary, and nail the hardwood flooring to the subfloor. Then, repeat steps 2 and 3 until the hardwood floor is completed.

U.S. Patent Publication No. 2006/0032175 discloses a method of making flooring products. Disclosed is a polymeric thermoplastic material plank that can be rectangular, triangular, square, hexagonal and octagonal, or have any number of sides. Also, the floor panel can have other geometrical designs, such as curves.

U.S. Pat. No. 10,138,639 illustrates a molding assembly for use in bridging a gap between floor covering materials.

Therefore, there is a need for a machine and method of installing flooring wherein the flooring can be folded to conform to contours during installation.

SUMMARY OF THE INVENTION

A method of applying heat and pressure to a plastic composite flooring system to fold into provisions, such as stair noses, baseboards, quarter rounds, T-moldings, endcaps, or the like is disclosed. The method includes incorporating a thermal insulation layer between the plastic composite flooring and a heat generator, applying heat until reaching a heat transmission coefficient to allow the plastic composite flooring to become malleable, removing the heat, applying pressure to the heated section of the plastic composite flooring to form into a desired shape using a positive and negative embossing die fold on the top and bottom heated section of the plastic composite flooring, and removing the embossing die-molds once the plastic composite flooring has cooled down to its initial temperature.

Accordingly, it is an objective of the instant invention to provide a plastic composite flooring system that can be folded and conformed by heat and pressure into provisions such as, but not limited to, stair noses, baseboards, quarter rounds, T-moldings, and endcaps.

It is another objective of the instant invention to facilitate the installation of LVP, LVT, SPC and WPC flooring over or into provisions to create seamless transitions in flooring, wall junctions, floor junctions, or the like, where otherwise different materials are used.

Another objective of the invention is to eliminate the need for stocking various provisions by providing a portable folding device that can form the various provisions at the installation location.

It is also an objective of the instant invention to further include the step of applying sufficient pressure to the positive and negative embossing die until both dies are locked in place and the plastic composite flooring is formed into a desired shape.

It is a further objective of the instant invention to further include the step of calculating the external bending curve length of the desired shape on the mold and heating the plastic composite flooring to a length of at least the external bending curve length.

It is yet another objective of the instant invention to further include the step of increasing an intended heated section of plastic composite by at least ten percent of the external bending curve length to accommodate for rounded finishes on the plastic composite flooring.

It is still another objective of the instant invention to provide a predetermined gap space within the thermal insulation layer to allow for proper heat transfer from the heat generator to the plastic composite flooring.

It is another objective of the instant invention to facilitate the installation of SPC and WPC flooring in traditional installations, as well as those situations where the floor to be covered has a nontraditional shape; that is, it is not square or rectangular, or where a substantial portion of its boundaries are not straight lines.

Other objectives and advantages of this invention will become apparent from the following description taken in conjunction with any accompanying drawings wherein are set forth, by way of illustration and example, certain embodiments of this invention. Any drawings contained herein constitute a part of this specification, include exemplary embodiments of the present invention, and illustrate various objects and features thereof.

DETAILED DESCRIPTION OF THE INVENTION

Referring now to FIGS. 1-6 in general, illustrated is a method of folding plastic composition flooring to form a desired shape. The method includes applying a predetermined amount of heat and pressure using a die and mold for a period of time to form the plastic composite flooring into a desired shape. The method incorporates a thermal insulation layer 20 between a plastic composite flooring 10 and a heat generator 30 to control the area of heating so as to maintain the overall integrity of the flooring plank. The plastic composite flooring 10, commonly referred to as a tile or plank, is defined by a top surface 12, a bottom surface 14 and a thermal insulation layer 20. The thermal insulation layer 20 is constructed and arranged to insulate the heat generating device 30 from the plastic composite flooring 10 providing a controllable heat source that is directed to heating sections 15, 17 of the plastic composite flooring 10. The thermal insulation layer 20 is positioned adjacent to the heat generator 30 which supplies sufficient heat at a desired temperature to allow the plastic composite flooring 10 to become malleable along the heating sections 15, 17 when positioned adjacent the thermal insulation layer 20. Incorporating the thermal insulation layer 20 between the heat generator 30 and the plastic composite flooring 10 allows for even heat distribution from the heat generator 30. The type of material, thickness, time of heating, the burning side temperature 12 and pressure are calculated to obtain the preferred bending of the composite flooring material within minimal time. It is important to note this process allows an installer to form the desired curves during the installation process.

Example 1: Material—WPC, thickness—4 mm, temperature—350° F., time—25 seconds, burning side material temperature—170° F., minimum pressure to bend every 12 inches—20 lbs.

Example 2: Material—WPC, thickness—5.5 mm, temperature—350° F., time—30 seconds, burning side material temperature—170° F., minimum pressure to bend every 12 inches—30 lbs.

Example 3: Material—WPC, thickness—6.5 mm, temperature—350° F., time—40 seconds, burning side material temperature—170° F., minimum pressure to bend every 12 inches—35 lbs.

Example 4: Material—WPC, thickness—9 mm, temperature—350° F., time—60 seconds, burning side material temperature—160° F., minimum pressure to bend every 12 inches—38 lbs.

Example 5: Material—SPC, thickness—3 mm, temperature—350° F., time—30 seconds, burning side material temperature—170° F., minimum pressure to bend every 12 inches—20 lbs.

Example 6: Material—SPC, thickness—5.5 mm, temperature—350° F., time—40 seconds, burning side material temperature—170° F., minimum pressure to bend every 12 inches—25 lbs.

Example 7: Material—SPC, thickness—9 mm, temperature—350° F., time—40 seconds, burning side material temperature—170° F., minimum pressure to bend every 12 inches—35 lbs.

Figure 1:
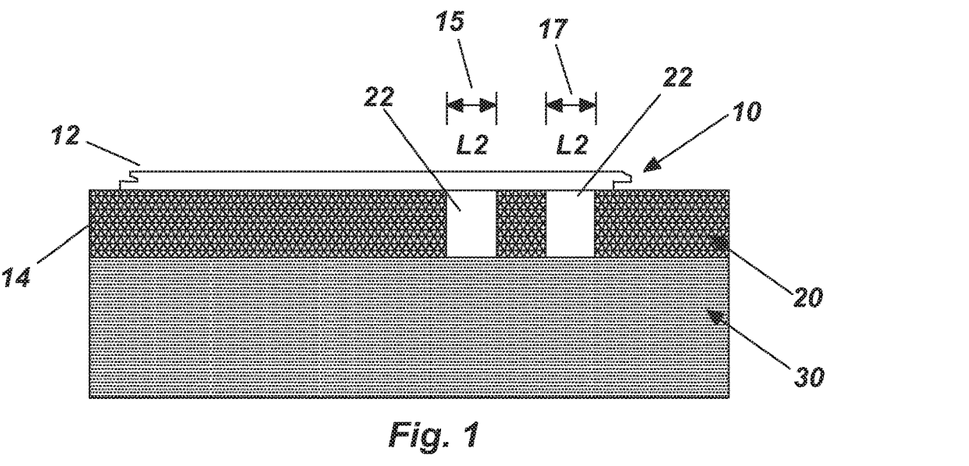
FIG. 1 is a cross-sectional side view of the plastic composite flooring, thermal insulation layer, and heat generating means of the instant invention.
Figure 2:
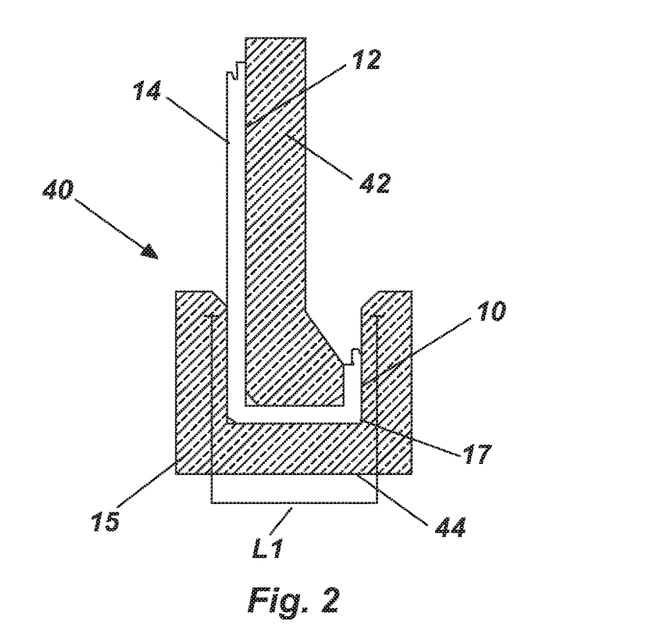
FIG. 2 is a cross-sectional side view of a die mold of the instant invention.

The thermal insulation layer 20 includes a predetermined gap space 22 to allow for proper heat transfer from the heat generator 30 to the plastic composite flooring 10. On the plastic composite flooring 10 there will be sections 15, 17 used as the area for folding to conform to a specific shape. Sections 15 and 17 on the plastic composite flooring 10 each have an equal length L2 that will be placed above the gap space 22 on the thermal insulation layer 20. This gap space 22 is sized to allow the heated plastic composite flooring 10 to form the corner sections 15, 17, forming a bottom wall 16 in FIG. 3. The gap space 22 is sized to allow sections 15 and 17 to become malleable. As illustrated in FIG. 2, a step may include calculating an external bending curve length L1 of a desired shape on a mold, and heating the section on the plastic composite flooring to the external bending curve length L1 on the mold. Further details below are provided for when a curved shape is desired.

The heat generator 30 must reach a heat transmission coefficient to allow the plastic composite flooring 10 to become malleable. Every plastic composite flooring 10 will have varying density and thickness, which will affect the required temperature needed to make the plastic composite flooring 10 malleable. Furthermore, each commercial brand has a variation in its density which could affect the heat transmission coefficient of the composite flooring, which may increase or decrease the time required to properly heat it to the point it becomes malleable at its heat transmission coefficient.

The heat generator 30 is removed after the plastic composite flooring 10 is heated and placed into a mold 40. A die is used to apply to sections of plastic composite flooring that have been heated. The heat generator can be a process selected from microwave, infrared, vapor, resistance, solar, induction, indirect flame, direct flame, hot air circulation, direct friction, or the like heat source. In the preferred embodiment, the material is heated to a temperature wherein the corner sections 15, 17 are sufficiently malleable for folding and placement within a die having either a positive, or a negative and positive, embossing mold to form the desired shape. Once the plastic composite flooring 10 is molded into position, the material is allowed to cool, wherein the desired shape is maintained.

The mold 40 is comprised of positive and negative embossing dies, 42 and 44, wherein the positive and negative embossing dies, 42 and 44, are applied on the top and bottom surfaces, 12 and 14, of the heated section of the plastic composite flooring 16. In order to create the desired shape, it is necessary to apply pressure based on each material's requirement to the positive and negative embossing die, 42 and 44, until both the dies are locked in place. The mold 40 must match the shape looking to be conformed, such as a rounded or square profile, shown in FIGS. 2 and 5.

Figure 3:
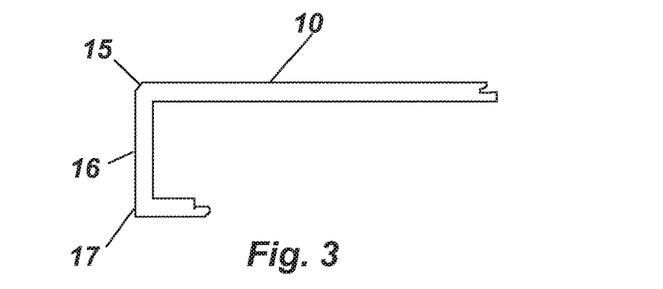
FIG. 3 is a side view of the conformed plastic composite flooring of the instant invention.
Figure 4:
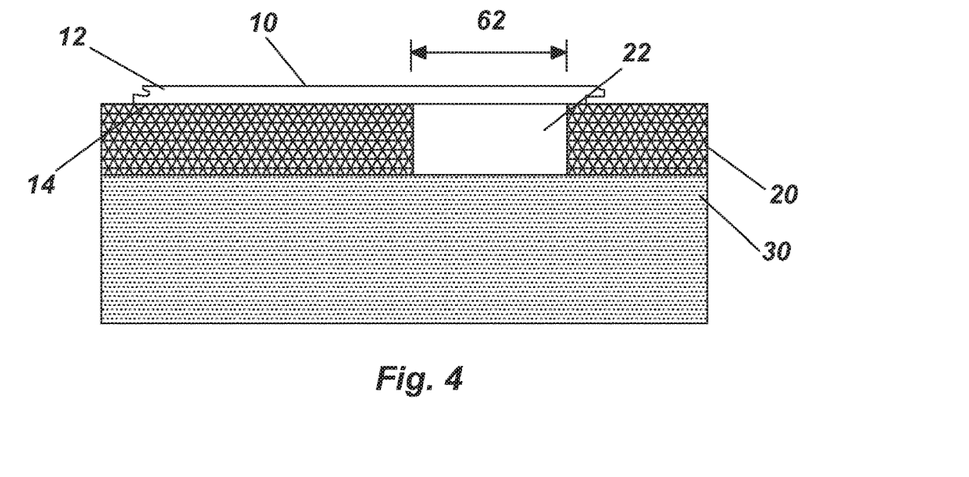
FIG. 4 is a cross-sectional side view of the plastic composite flooring, thermal insulation layer, and heat generating means of the instant invention.
Figure 5:
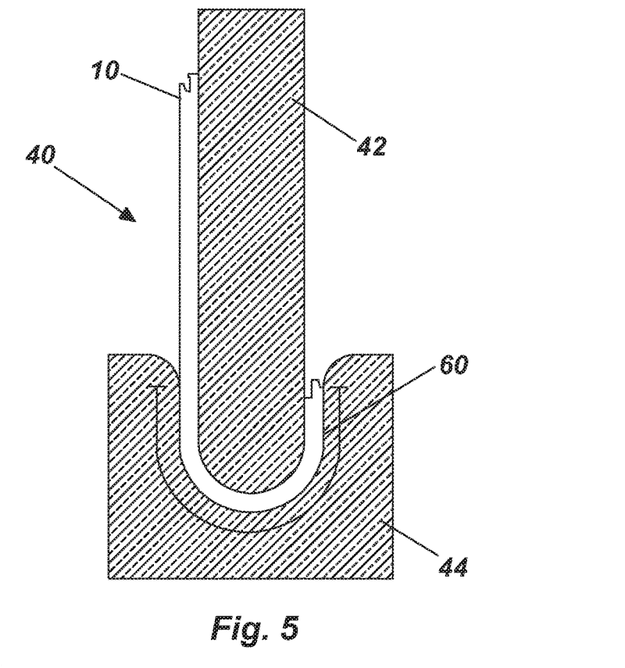
FIG. 5 is a cross-sectional side view of a rounded die mold of the instant invention.

The final step is removing the mold 40 once the plastic composite flooring 10 has cooled down to its initial temperature. Once the cooling step is done, the folded plastic composite flooring 10 will keep its desired shape without losing any of its inherent structural properties, as shown in FIGS. 3 and 6.

Figure 6:
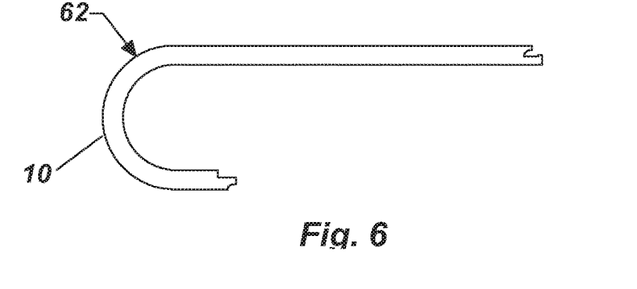
FIG. 6 is a side view of the conformed rounded plastic composite flooring of the instant invention.

In circumstances where the desired shape is rounded, as shown in FIG. 6, it is necessary to calculate the external bending curve length 60 of the desired shape and increase the section length 62 on the plastic composite flooring 10 that is to receive the heat and the corresponding gap space 22 in the thermal insulation layer 20 by ten percent to accommodate for the rounded finish.

The heat insulator 30, thermal insulation layer 20, and mold 40 (positive and negative embossing die, 42 and 44) form a kit that is lightweight and easily transportable to jobsites. The installer at the jobsite is able to use the conventional flooring material to form stair noses, baseboards, quarter rounds, T-moldings, endcaps, and so forth, at the installation location. Use of the kit eliminates the need to match provisions to the conventional flooring, thereby assuring the provisions exactly match the flooring, including grain, color, shading, and texture.

The composite flooring may include an inset, such as a decorative strip, a reflective strip, or an LED strip to highlight a step, baseboard, or any other object constructed from the composite material. The folding method allows the inset to be placed at a predetermined position. For example, the insert can be used to differentiate between individual stair steps. Based upon consumer preference, the use of a decorative strip having a design or color can help differentiate in daylight conditions. The use of a reflective or fluorescent strip provides a glow in the dark element that helps to differentiate the steps in low light conditions.

Figure 7:
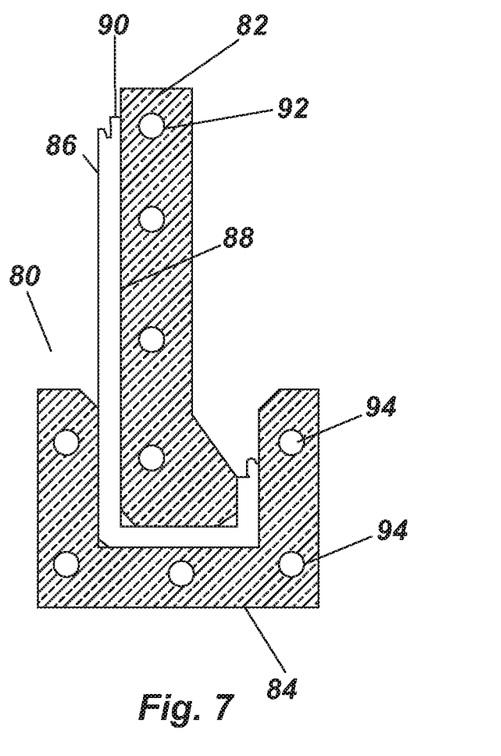
FIG. 7 is a cross-sectional side view of a water cooled die mold.

Referring to FIG. 7, in an alternative embodiment, a mold 80 is comprised of positive and negative embossing dies, 82 and 84. The positive and negative embossing dies, 82 and 84, are applied on the top and bottom surfaces, 86 and 88, of the heated section of the plastic composite flooring 90. In order to create the desired shape, it is again necessary to apply pressure based on each material's requirement to the positive and negative embossing die, 82 and 84, until both dies are locked in place. In this embodiment, to accelerate a cooling process after the material is embossed, a coolant is drawn through apertures 92 formed in the positive die 82. Additionally, a coolant can be drawn through apertures 94 formed in the negative die 84.

Figure 8:
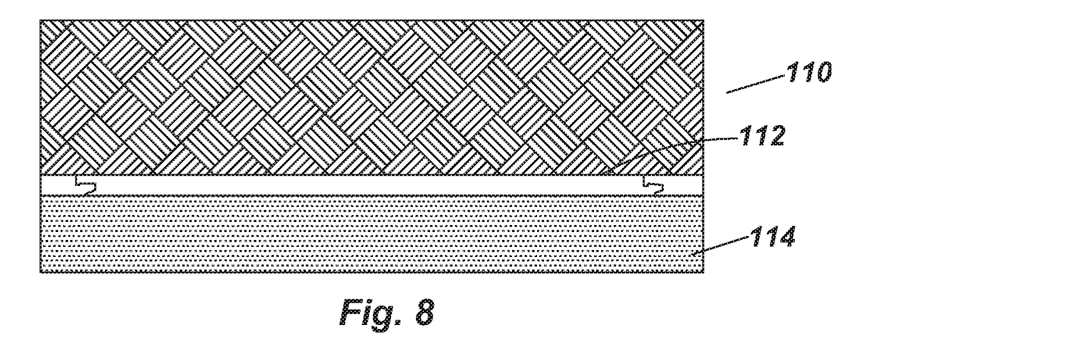
FIG. 8 is a cross-sectional side view of an oven.
Figure 9:
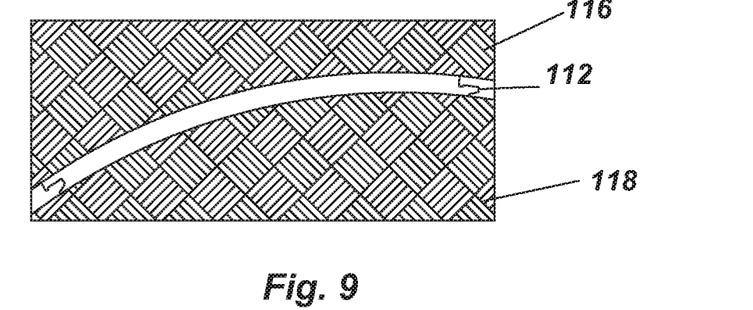
FIG. 9 is a cross-sectional side view of conforming molds.

FIG. 8 is a cross-sectional side view of an oven 110, illustrating a heating process wherein a plank 112 is placed on top of thermal insulation 114 to provide heating of the plank in a preferred directional pattern. FIG. 9 is a cross-sectional side view of conforming molds 116 and 118 with the heated plank 112 placed therebetween to obtain a desired shape.

Figure 10:
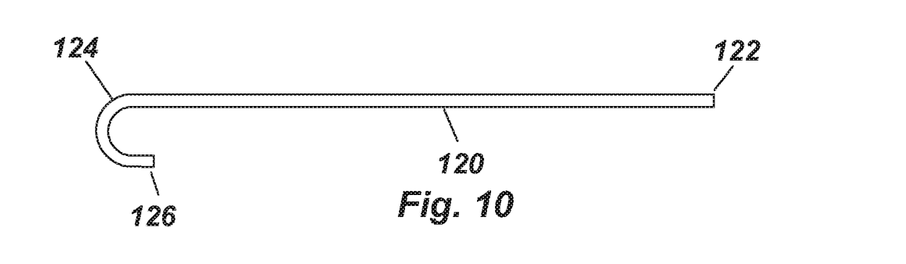
FIG. 10 is a side view of a conformed rounded composite for use with a window or stair step.
Figures 11, 12:
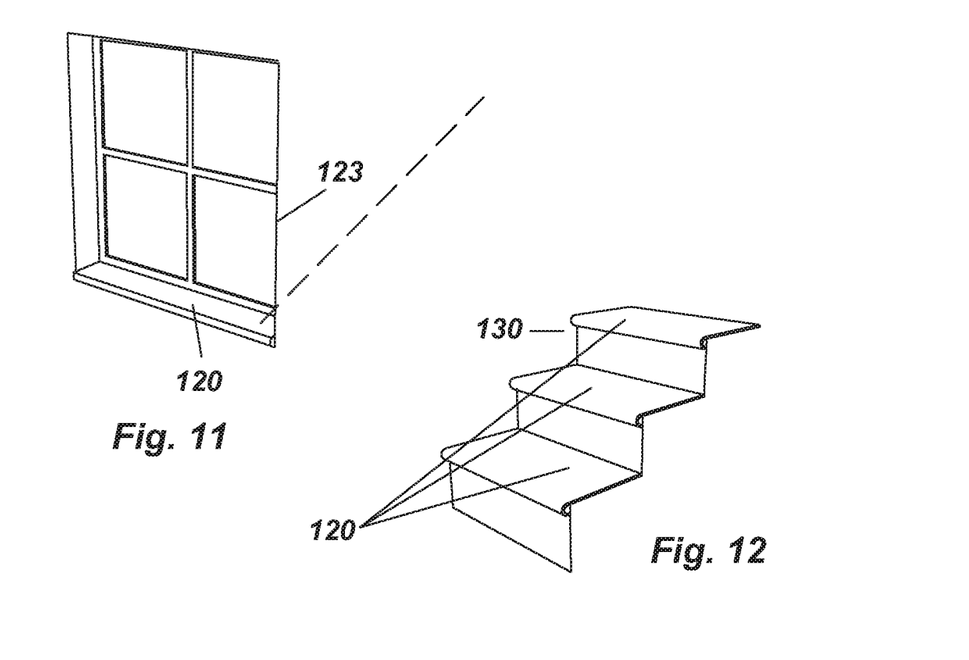
FIG. 11 is a pictorial of a window with the rounded composite.
FIG. 12 is a pictorial of stair steps with the rounded composite.

FIG. 10 illustrates an example of a full thread plank 120 having a first end 122 spaced apart from a radius end 124, the radius end 124 having a radius of 0.75" forming a 1.5" wrap of the surface to an opposite end 126. The plank 120 can be applied to a window frame 128 as shown in FIG. 11. Alternatively, the plank 120 can be applied to stairs as depicted in FIG. 12.

It is to be understood that while a certain form of the invention is illustrated, it is not to be limited to the specific form or arrangement herein described and shown. It will be apparent to those skilled in the art that various changes may be made without departing from the scope of the invention and the invention is not to be considered limited to what is shown and described in the specification and any drawings/figures included herein. The invention is readily adaptable to LVP, LVT, SPC, WPC or the like materials.

One skilled in the art will readily appreciate that the present invention is well adapted to carry out the objectives and obtain the ends and advantages mentioned, as well as those inherent therein. The embodiments, methods, procedures and techniques described herein are presently representative of the preferred embodiments, are intended to be exemplary, and are not intended as limitations on the scope. Changes therein and other uses will occur to those skilled in the art which are encompassed within the spirit of the invention and are defined by the scope of the appended claims. Although the invention has been described in connection with specific preferred embodiments, it should be understood that the invention as claimed should not be unduly limited to such specific embodiments. Indeed, various modifications of the described modes for carrying out the invention which are obvious to those skilled in the art are intended to be within the scope of the following claims.

The use of the word "a" or "an" when used in conjunction with the term "comprising" in the claims and/or the specification may mean "one," but it is also consistent with the meaning of "one or more" or "at least one." The use of the term "or" in the claims is used to mean "and/or" unless explicitly indicated to refer to alternatives only or the alternative are mutually exclusive, although the disclosure supports a definition that refers to only alternatives and "and/or."

The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a method or device that "comprises," "has," "includes" or "contains" one or more steps or elements, possesses those one or more steps or elements, but is not limited to possessing only those one or more elements. Likewise, a step of a method or an element of a device that "comprises," "has," "includes" or "contains" one or more features, possesses those one or more features, but is not limited to possessing only those one or more features. Furthermore, a device or structure that is configured in a certain way is configured in at least that way, but may also be configured in ways that are not listed.

What is claimed is:

1. A method of folding plastic composition flooring to form a desired shape at the point of use comprising the steps of:
   positioning a thermal insulation layer having predetermined spaced apart gap spaces between a piece of plastic composite flooring and a heat generator;
   applying heat from said heat generator through said gap spaces of said thermal insulation layer onto sections of said plastic composite flooring until reaching a heat transmission coefficient wherein said sections of said plastic composite flooring becomes malleable;
   placing said plastic composite flooring into a mold formed from a negative embossing die and a positive embossing die;
   introducing a predetermined amount of pressure to said positive embossing die to cause a folding of said sections of said plastic composite flooring into a desired shape as defined by said negative embossing die;
   maintaining said predetermined amount of pressure for a predetermined amount of time;
   displacing said dies to allow said plastic composite flooring to cool.

2. The method of folding plastic composition flooring according to claim 1, wherein said gap spaces are constructed and arranged to allow heat transfer from said heat generator to said plastic composite flooring.

3. The method of folding plastic composition flooring according to claim 1, wherein said mold is comprised of a positive embossing die and a negative embossing die applied on the top and bottom of said plastic composite flooring heated section.

4. The method of folding plastic composition flooring according to claim 1, including the step of applying a predetermined pressure to said die when said heated sections are at predetermined temperature for ease of forming a desired shape.

5. The method of folding plastic composition flooring according to claim 1, including the step of calculating an external bending curve length of a desired shape on a mold and heating said plastic composite flooring to a length of at least said external bending curve length.

6. The method of folding plastic composition flooring according to claim 5, including the step of increasing the temperature of a heated section by about ten percent of said external bending curve length to accommodate rounded finishes on said plastic composite flooring.

7. The method of folding plastic composition flooring according to claim 1 wherein said compostions is selected from the group consisting of SPC, WPC, LVP or LVT.

8. The method of folding plastic composition flooring according to claim 1 including the step of locking said positive embossing die to said negative embossing die.

9. The method of folding plastic composition flooring according to claim 1 wherein said positive embossing die includes water circulation channels for receipt of cooling water to accelerate cooling of said plastic composite flooring after heating.

10. The method of folding plastic composition flooring according to claim 1 wherein said plastic composition includes an insert, said insert positioned between said spaced apart sections.

\* \* \* \* \*